United States Patent [19]
Mansi et al.

[11] 3,863,894
[45] Feb. 4, 1975

[54] JACKING APPARATUS FOR A TRAILER TONGUE

[75] Inventors: Joseph S. Mansi; Larry W. Spence, both of Orlando, Okla.

[73] Assignee: The Charles Machine Works, Inc., Perry, Okla.

[22] Filed: Sept. 20, 1973

[21] Appl. No.: 399,335

[52] U.S. Cl. .............................................. 254/86 R
[51] Int. Cl. .............................................. B60s 9/02
[58] Field of Search .................. 108/131, 132, 125; 254/86 R, 86 H; 280/150.5; 214/515; 212/145; 248/188.6

[56] References Cited
UNITED STATES PATENTS
2,555,336  6/1951  Hagely .............................. 254/86 R
3,491,706  1/1970  Glass ................................ 248/188.6

Primary Examiner—Othell M. Simpson

[57] ABSTRACT

A trailer tongue jacking apparatus includes a jacking mechanism and a mounting member attached thereto which is received and engaged by a socket attached to the trailer tongue. The mounting member has a first portion of regular polygonal external cross section and a second portion of circular cross section axially aligned with and extending outwardly from the first portion. The trailer tongue mounting socket has a cavity of regular polygonal internal cross section for supportably receiving and engaging the mounting member first portion, the cavity having an aperture at one end extending axially of the cavity cross section to slidably and rotatably engage the mounting member second portion. Biasing means urge the mounting member into supportable engagement with the mounting socket cavity.

4 Claims, 3 Drawing Figures

JACKING APPARATUS FOR A TRAILER TONGUE

BACKGROUND OF THE INVENTION

The instant invention relates to apparatus for jacking and supporting trailer tongues. The device is applicable to and suited for use with any type of trailer and is particularly desirable for supporting a trailer tongue when the trailer is detached from the towing vehicle.

The prior art presents a number of devices for supporting trailer tongues, but none has been completely satisfactory for all such uses. For example, apparatus suitable for jacking and supporting tongues and other portions of heavy trailers have necessitated complex and expensive pivoting mechanisms with machined detent plates and multiple locking mechanisms. Prior art simple devices have generally required the manipulation of threaded fasteners and thus have frequently made the stability of the supporting mechanism dependent upon the tightening of such fasteners. Additionally, the simple structures have generally included only adjustable supporting devices and have not included mechanisms for jacking or raising the trailer tongue from a lowered position. None of the prior art devices has provided a simple mounting means suitable for supporting heavy loads.

SUMMARY OF THE INVENTION

It is a primary object of this invention to provide apparatus for jacking and supporting a trailer tongue.

A further object of this invention is to provide a mounting arrangement for a trailer tongue jacking apparatus which is inexpensive and simple to manipulate between a stowed position and an operative position, yet is strong enough to support heavy loads.

Briefly, the invention contemplates apparatus for jacking and supporting a trailer tongue, the preferred apparatus having a jacking mechanism, an elongated mounting member attached to the jacking mechanism with such mounting member being supportably received and engaged by a mounting socket attached to the trailer tongue. The mounting member, which is attached to the jacking mechanism with its longitudinal axis normal to the axis of the jacking mechanism, has a first portion of regular polygonal cross section and a second portion of circular cross section axially aligned with the first portion. The mounting socket has a cavity of regular polygonal internal cross section corresponding to the mounting member cross section, and the cavity further features an aperture at one end extending axially of the cavity cross section for slidably and rotatably engaging the mounting member second portion. The mounting member, received and engaged by the socket, may be axially withdrawn from the socket sufficiently to disengage the first portion from the cavity and may then be rotated within the aperture by engagement of such aperture with the mounting member second portion. The mounting member may then be restored to supportable engagement with the cavity by the mounting member first portion. Biasing means urges the mounting member into such supportable engagement with the mounting socket cavity.

BRIEF DESCRIPTION OF THE DRAWINGS

The invention having been generally described, a specific embodiment will be discussed in detail with reference to the accompanying drawings in which.

DESCRIPTION OF A PREFERRED EMBODIMENT

Figure 1:
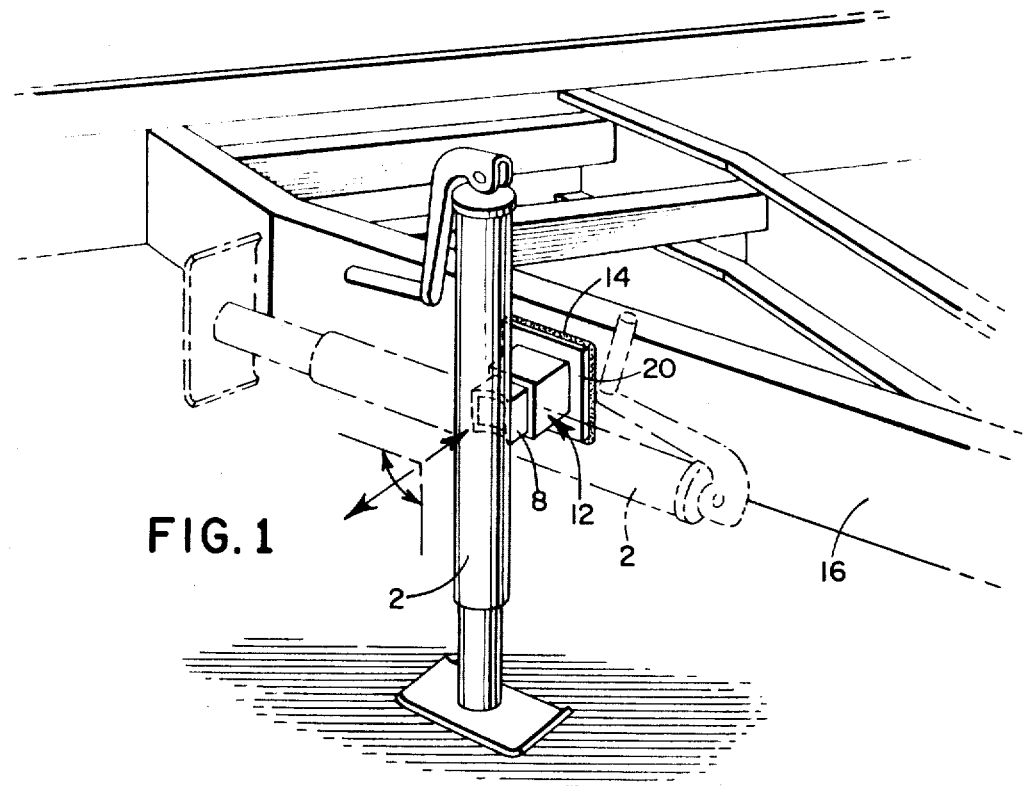
FIG. 1 is a front perspective view of the apparatus attached to a trailer tongue, with the jack being shown in the operable position in solid lines and in the stowed position in phantom.
Figure 2:
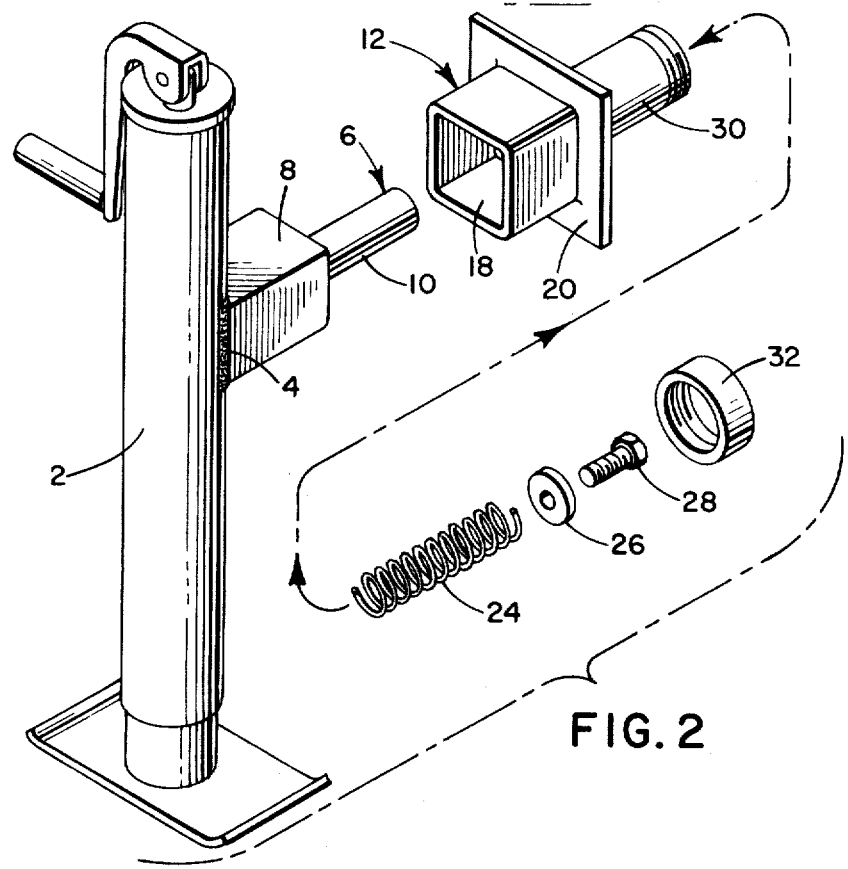
FIG. 2 is an exploded view of the components of a preferred embodiment of this apparatus.

The device of this invention is shown in FIG. 1 with the jacking mechanism in its operative position illustrated by the solid line drawing and in its stowed position as shown in phantom. A jacking mechanism 2, which conveniently may be a conventional screw-type jack, is attached, by weldments 4 or other convenient means, to elongated mounting member 6. Mounting member 6 is attached with its longitudinal axis generally normal to the longitudinal axis of the jacking mechanism 2.

Figure 3:
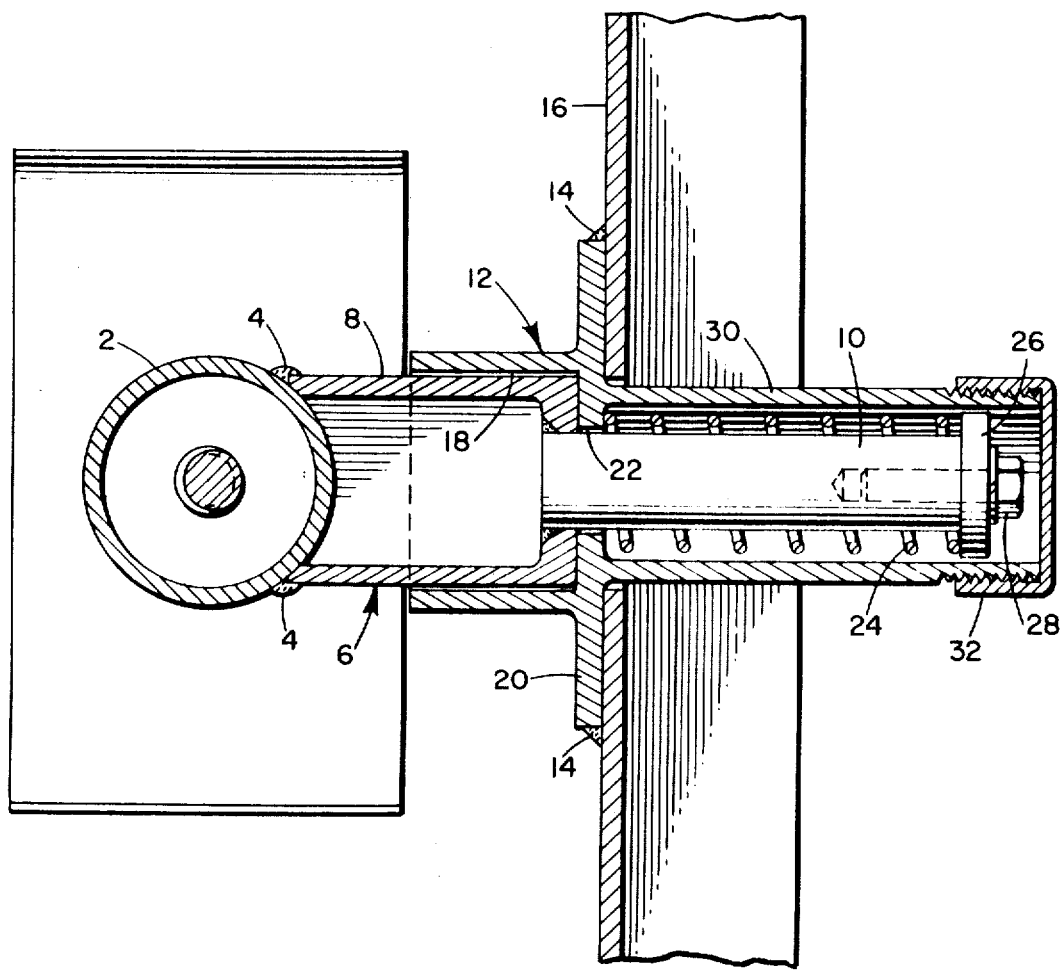
FIG. 3 is a horizontal sectional view of this apparatus taken along the centerline of the mounting member and socket.

Mounting member 6 includes two adjoining portions, a first portion 8 of generally square cross section, preferably, abutting the jacking mechanism and a second portion 10 of circular cross section axially aligned with and extending outwardly from the first portion. The diameter of this second portion 10 is equal to or smaller than the square dimension of the first portion 8. This mounting member 6 may conveniently be fabricated from a section of square steel tubing having one end closed and having a circular rod or section of tubing welded or otherwise fastened to such closed end to form the outwardly projecting circular second portion 10, as best shown in FIG. 3.

Mounting member 6 is received by mounting socket 12, which is attached by weldments 14 or other convenient means to the trailer tongue 16. This socket includes an outwardly facing cavity 18 of generally square internal cross section, the back side of such cavity being defined by backing plate 20. The backing plate 20 has an aperture 22 therethrough, such aperture being positioned and dimensioned to slidably and rotatably engage the second portion 10 of the mounting member 6. Thus, when the mounting member 6 is fully engaged with the socket 12, the square first portion 8 of the mounting member is supportably engaged with the square cavity 18 of the socket; and the cylindrical second portion 10 of the mounting member 6 projects through the aperture 22 of the backing plate 20, as shown in FIG. 3. In this embodiment, the mounting member second portion 10 extends through the side wall of the trailer tongue 16.

The length of mounting member second portion 10 is sufficient that, when the mounting member is axially withdrawn from engagement with the socket 12 sufficiently to free the square first portion 8 from its engagement with cavity 18, part of mounting member second portion 10 will remain in slidable and rotatable engagement with aperture 22. Thus, the mounting member 6 and jacking mechanism 2 associated therewith may be rotated about the axis of such mounting member 6 and then, with the orientation of the jacking mechanism some multiple of 90° from the original position, may have the mounting member first portion 8 reinserted into full supportable engagement with cavity 18.

Mounting member 6 is urged into full engagement with socket 12 by biasing means which may conveniently be a compression spring 24 exerting an axial force on the mounting member 6. As is best shown in FIG. 3, this compression spring 24 may be held between the outer end of mounting member second portion 10 and the back side of backing plate 20. The spring is held in this position by its abutting relationship with backing plate 20 and by an end plate 26 which is held at the outer extremity of mounting member portion 10 by fastener 28 or other convenient means, such fastener being illustrated by a bolt overlying a lock washer, the bolt being threaded into a bore in the end of mounting member portion 10.

A hollow cylindrical housing 30 may be provided to enclose mounting member second portion 10 and the spring 24, and an end cap 32 may also be provided for fully enclosing such mounting member portion and spring assembly.

With the structure described above the operation of this jacking apparatus is essentially as follows. If the trailer tongue 16 is either resting on the ground or attached to a trailer hitch on a vehicle, and it is desired to support and lift such tongue, the jacking apparatus 2 may be moved from its stowed position, generally horizontal to the ground, to its operative position, generally normal to the ground. This movement is achieved by pulling the jacking mechanism 2 outwardly sufficiently to disengage the square first mounting member portion 8 from the cavity 18 of socket 12. The jacking apparatus 2 cannot be completely removed from the trailer tongue because of the spring 24 and end plate 26 holding the mounting member second portion captive within the socket 12. However, with the square portion moved axially out of engagement with socket 12, the jack may be rotated from its stowed position, shown by phantom lines in FIG. 1 to its operative position, shown by the solid line depiction in FIG. 1. When the jacking mechanism 2 has been rotated 90 degrees, or some multiple thereof, release of the axially outward pull against the action of spring 24 will allow spring 24 to return the generally square first portion 8 of the mounting member to supportable engagement with the cavity 18 of the mounting socket. In this position the jacking mechanism 2 may be operated to lift the trailer tongue 16 and to provide the vertical support for such tongue. Obviously, in a like manner, the jacking mechanism, when withdrawn from contact with the ground, may be rotated about the mounting member axis to be held in its original stowed position or in any other position being a multiple of 90 degrees from such position.

The foregoing is considered as illustrative only of the principles of the invention. Since numerous modifications and changes, including but not limited to other regular polygonal cross sections for mounting member first portion 8, other types of jacking mechanisms, the reversal of parts and other variations, will readily occur to those skilled in the art, it is not desired to limit the invention to the exact construction and operation shown and described. In using the term "generally square cross section" for portion 8, it is contemplated that, within the range of equivalents, such other regular polygonal cross sections are embraced. Accordingly, all suitable modifications, reversals of parts and equivalents falling within the scope of the following claims are deemed to be included.

I claim:

1. Trailer tongue jacking apparatus comprising:
   a trailer having a tongue for connecting the trailer to a towing vehicle;
   a variable length jacking mechanism;
   a mounting member having a longitudinal axis generally normal to the longitudinal axis of said jacking mechanism, said member having a first portion of regular polygonal external cross section of constant dimension throughout its length and having a second portion of circular external cross section axially aligned with said first portion;
   a mounting socket having a cavity of regular polygonal internal cross section, corresponding to said mounting member first portion external cross section, for supportably receiving and engaging said mounting member first portion, said socket having an aperture at one end extending axially of said cavity cross section for slidably and rotatably engaging said mounting member second portion, whereby said mounting member received and engaged by said socket may be axially withdrawn sufficiently to disengage said first portion from said cavity and may then be rotated within said aperture by engagement of said mounting member second portion with said aperture and may then be restored to said supportable engagement by said mounting member first portion being engaged with said cavity;
   means biasing said mounting member into said supportable engagement with said mounting socket cavity; and
   one of said mounting member and said mounting socket being attached to said jacking mechanism and the other having means attaching it to said trailer tongue.

2. The trailer tongue jacking apparatus according to claim 1 wherein each said regular polygonal cross section is generally square.

3. The trailer tongue jacking apparatus according to claim 1 wherein said first portion of said mounting member is attached to said jacking mechanism and said second portion of said mounting member extends outwardly of said first portion, and
   said cavity of said mounting socket opens outwardly toward said mounting member with said aperture of said socket being formed in a backing plate connected to said tongue forming the bottom of said cavity whereby said second portion of said mounting member passes through said aperture and said first portion of said mounting member is movable inwardly and outwardly relative to said outwardly opening cavity.

4. The trailer tongue jacking apparatus according to claim 1 further comprising a hollow cylindrical member attached to said apparatus concentric with said socket aperture and extending outwardly opposite said socket cavity, said hollow cylindrical member being adapted to receive and guide said mounting member second portion and having said mounting member biasing means housed therewithin, and further comprising means closing the outer end of said hollow cylindrical member.

* * * * *